(12) United States Patent
Hwang et al.

(10) Patent No.: US 12,379,521 B2
(45) Date of Patent: Aug. 5, 2025

(54) METHOD AND SYSTEM FOR INTEGRATED SURFACE WATER AND GROUNDWATER MODELLING USING A DYNAMIC MESH EVOLUTION

(71) Applicant: Aquanty Inc., Waterloo (CA)

(72) Inventors: Hyoun-Tae Hwang, Waterloo (CA); Young-Jin Park, Waterloo (CA); Steven J. Berg, Waterloo (CA); Edward Sudicky, Waterloo (CA)

(73) Assignee: AQUANTY INC., Waterloo (CA)

( * ) Notice: Subject to any disclaimer, the term of this patent is extended or adjusted under 35 U.S.C. 154(b) by 961 days.

(21) Appl. No.: 17/273,958

(22) PCT Filed: Sep. 6, 2019

(86) PCT No.: PCT/CA2019/051246
§ 371 (c)(1),
(2) Date: Mar. 5, 2021

(87) PCT Pub. No.: WO2020/047671
PCT Pub. Date: Mar. 12, 2020

(65) Prior Publication Data
US 2021/0333434 A1    Oct. 28, 2021

Related U.S. Application Data

(60) Provisional application No. 62/727,728, filed on Sep. 6, 2018.

(51) Int. Cl.
*G01V 20/00*    (2024.01)
*G06F 16/907*    (2019.01)
*G06T 17/05*    (2011.01)

(52) U.S. Cl.
CPC ............ *G01V 20/00* (2024.01); *G06F 16/907* (2019.01); *G06T 17/05* (2013.01); *G01V 2210/661* (2013.01)

(58) Field of Classification Search
CPC ........ G01V 20/00; G06F 16/907; G06T 17/05
See application file for complete search history.

(56) References Cited

U.S. PATENT DOCUMENTS

| | | | |
|---|---|---|---|
| 8,665,266 B2* | 3/2014 | Vandrovec | G06T 17/005 345/420 |
| 2016/0131800 A1* | 5/2016 | Pecher | G06F 30/23 703/10 |
| 2018/0348400 A1* | 12/2018 | Hsu | G01V 20/00 |

OTHER PUBLICATIONS

Frey SK, Hwang HT, Park YJ, Hussain SI, Gottschall N, Edwards M, Lapen DR. Dual permeability modeling of tile drain management influences on hydrologic and nutrient transport characteristics in macroporous soil. Journal of Hydrology. Apr. 1, 2016; 535:392-406. (Year: 2016).*

* cited by examiner

*Primary Examiner* — Chuen-Meei Gan
(74) *Attorney, Agent, or Firm* — Gowling WLG (Canada) LLP

(57) ABSTRACT

A method and system for integrated surface water and groundwater modelling using a dynamic mesh evolution. The system includes a dynamic mesh evolution that enables elevation changes in a landscape to be better represented in a simulation model. By moving, adding or removing computation nodes within the model over a predetermined range and updating the metadata, elevation changes may be better represented.

14 Claims, 5 Drawing Sheets

METHOD AND SYSTEM FOR INTEGRATED SURFACE WATER AND GROUNDWATER MODELLING USING A DYNAMIC MESH EVOLUTION

CROSS-REFERENCE TO OTHER APPLICATIONS

This application claims priority from U.S. Provisional Application No. 62/727,728 filed Sep. 6, 2018, the contents of which are hereby incorporated by reference.

FIELD

The disclosure is generally directed at computer modelling and, more specifically, at a method and system for integrated surface water and groundwater modelling using a dynamic mesh evolution.

BACKGROUND

Over the years computer modelling has been used to great effect in different fields or technology. In one aspect, architects may use computer modelling to generate models of buildings or homes so that people get a visual insight into the architect's design. In some other applications, computer modelling uses numerical analysis to approximate future scenarios or situations. These predictive models may assist companies or individuals to predict what may occur in the future based on a historical and/or current context. This has proven beneficial in the prediction of earthquakes or other possible natural disasters.

Another area where computer modelling may find benefit is in the field of geology. With the concerns of erosion or other environmental issues, it would be beneficial to have a way to predict how the environment might respond to natural and human actions.

Currently in landscapes that are experiencing significant changes to topography and materials distribution (e.g., open pit surface mining), a hydrologic modeller has two options for representing the evolving landscape. One option is to develop a series of snapshot models representing individual mine states which is cost prohibitive and potentially inaccurate due to continuity and mass balance issues. Another option is to use features already available in integrated hydrologic models such as transient material properties and boundary conditions to mimic the effect of the changing landscape, however this approach does not allow the modeller to directly interrogate landscape features as they are not explicitly represented in the model.

This in turn, produces a demand for a method and system for modelling surface water and groundwater that is capable of explicitly representing an evolving landscape such that new features (e.g., pits, tailings piles) can be accurately represented within a single continuous simulation.

Therefore, there is provided a method and system for integrated surface water and groundwater modelling using a dynamic mesh evolution.

SUMMARY

The disclosure is directed to methods and systems for use in hydrologic modelling including both surface water and groundwater with a deforming numerical mesh to represent a changing landscape. In one embodiment, the modelling is performed to predict how surface water and groundwater flow may respond to mining or other landform disturbances.

To accurately simulate water flow through the landscape being modelled, the system and method of the disclosure accounts for all relevant features of the landscape; including, but not limited to, subsurface material properties and distribution (e.g., sand, clay, gravel), climatology (e.g., temperature, precipitation, wind speed), land surface details (e.g., land use, vegetation class), and topography.

In one embodiment, the disclosure is directed at a system and method of integrated surface water and groundwater modeling based on a rigorous conceptualization of the hydrologic system.

In one aspect of the disclosure, there is provided a method of integrated surface water and groundwater modelling for a predetermined landscape including processing elevation and material property information associated with the predetermined landscape to determine location of a set of nodes; determining, based on received input data, if any of the set of nodes need to be repositioned whereby if at least one node needs to be to repositioned, adding or removing nodes in a dynamic element mesh; and updating metadata associated with each of the set of nodes to reflect elevation changes within the landscape.

In another aspect, the method further includes generating a model based on the updated metadata; and displaying the model. In another aspect, before processing the elevation and material property information: pre-processing the input data. In yet another aspect, determining if nodes within a model of the predetermined landscape need to be repositioned includes processing the input data with respect to subsurface and surface domain options; processing the input data with respect to process options; and determining if an elevation change has occurred due to the subsurface and surface domain options and the process options.

In a further aspect, processing the input data with respect to subsurface domain options includes processing the input data with respect to a porous medium domain; and processing the input data with respect to at least one of a dual continuum domain, a two-dimensional (2D) domain and a one-dimensional (1D) domain. In an aspect, processing the input data with respect to the surface domain options includes processing the input data with respect to at least one of a two-dimensional (2D) overland domain and a one-dimensional (1D) channel domain. In yet another aspect, displaying the model includes converting the updated metadata to predetermined data formats. In yet a further aspect, the predetermined data formats are compatible with $3^{rd}$ party visualization tools. In an aspect, the input data is processed in a steady state or a transient state.

In another aspect of the disclosure, there is provided a system for integrated surface water and groundwater modelling for a predetermined landscape including a processor including: a simulation module having stored within instructions that, when executed cause the processor to process elevation and material property information associated with the predetermined landscape to determine location of a set of nodes; determine, based on received input data, if any of the set of nodes need to be repositioned whereby if at least one node needs to be to repositioned, adding or removing nodes in a dynamic element mesh; and update metadata associated with each of the set of nodes to reflect elevation changes within the landscape.

In another aspect, the system further includes a pre-processing component for processing the input data and for transmitting the processed input data to the simulation module. In another aspect, the pre-processing component is integrated within the processor. In yet a further aspect, the system further includes a post-processing component for receiving the updated metadata and for generating a model based on the updated metadata. In another aspect, the post-processing component is integrated within the processor.

In a further aspect, the system includes a communication module to enable the system to communication with other servers or devices. In another aspect, the system includes a database for storing the updated metadata.

DESCRIPTION OF THE DRAWINGS

Embodiments of the present disclosure will now be described, by way of example only, with reference to the attached Figures.

DETAILED DESCRIPTION

The disclosure is directed at a system and method for integrated surface water and groundwater modelling. In one embodiment, the disclosure uses a dynamic or deforming mesh evolution to assist in the system and method of the disclosure. The dynamic mesh evolution allows elevation changes to be displayed in the generated model. In another embodiment, the disclosure provides a continuous simulation of landforms by deforming a numerical mesh to create or remove material as the landscape evolves. In this manner, a continuous and water mass conservative simulation may be generated. In a further embodiment, the disclosure is directed at a system and method for generating more realistic predictions of impacts to the environment caused by mine operations.

In a preferred embodiment, in order to manage or forecast how certain natural or human actions or processes may affect water flow, the disclosure includes a dynamic mesh evolution component. As such, for the preferred embodiment, a model, representation or map of an evolving landscape is handled by either moving the position of computational nodes to conform to changing topography (seen as nodal repositioning) and/or 2) adding and/or removing computational nodes and finite elements (node manipulation). A computational node is the location at which the governing equations for surface water and groundwater flow are solved. The computational nodes may also be seen as representing different points of interest or elevation within the model to assist in the generation of the model for display.

Nodal repositioning involves updating the position of the computational nodes as required during a solution timestep according to a time series of landscape elevation rasters. A solution timestep may be seen as the temporal resolution of numerical simulation that allows it to capture the transient nature of the system being modelled (e.g., changes in stream flow or groundwater levels over time due to changes in climate/weather or changes in the topography as captured by the dynamic mesh). The temporal evolution of the landscape being modelled is computed in discrete blocks, or timesteps. For example, if the simulation covers 1 year, the temporal resolution of the solution may range from 6 to 24 hrs depending on the dynamic nature of the system. For solution timesteps that lie between landscape elevation rasters, the elevation of the computational node is linearly interpolated. For node manipulation where the landscape changes exceed a threshold, new computational nodes and finite elements may be added or removed to conform to the changing elevation of the landscape. This will be described in more detail below.

Figure 1:
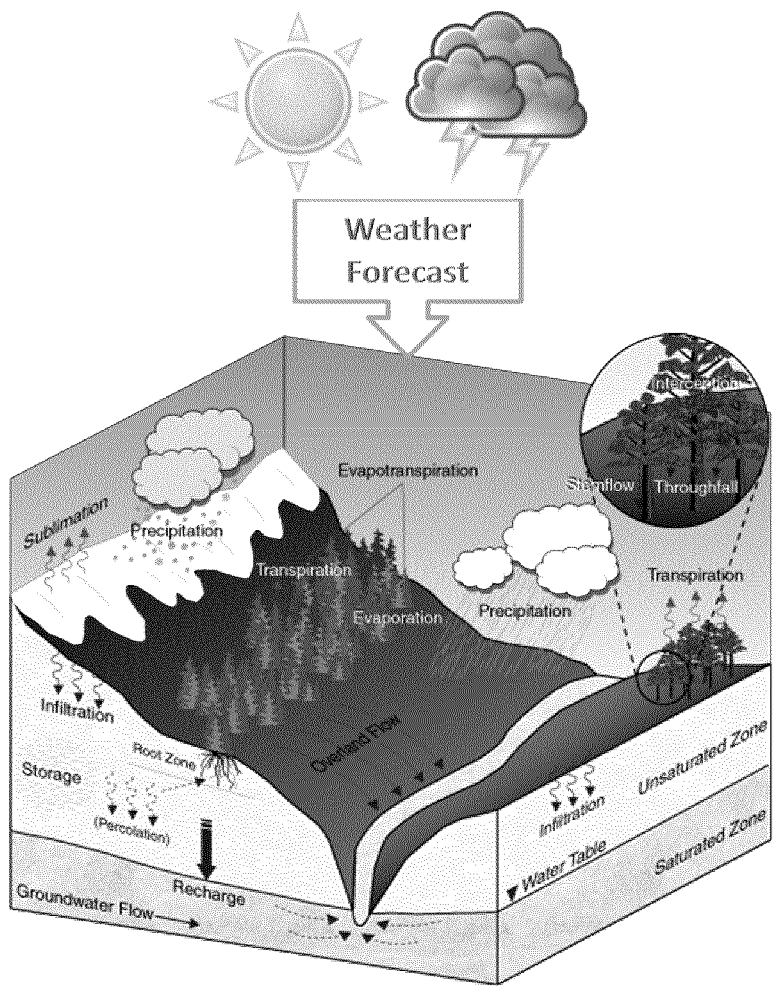
FIG. 1 is a schematic diagram of an integrated hydrologic model.

Turning to FIG. 1, a schematic diagram of an integrated hydrologic model is shown. The model or representation provides information relating to how a landscape is affected by different influences such as, but not limited to, weather, mining and/or natural causes. Although shown as a static image, it will be understood that the model is generally one that provides images over a predetermined time period to provide a model that shows an evolution of the changing landscape over time.

In a preferred embodiment, the model is a fully-coupled three-dimensional (3D) model that is based on partial differential equations (PDEs) that capture interactions between surface and subsurface water flow, solute and/or energy transport. In one embodiment, the model is generated using only individual water cycle components. One advantage of the current disclosure is that there is an increased emphasis on physical representation of processes and a reduced or minimal use of empirical relations.

Figure 2:
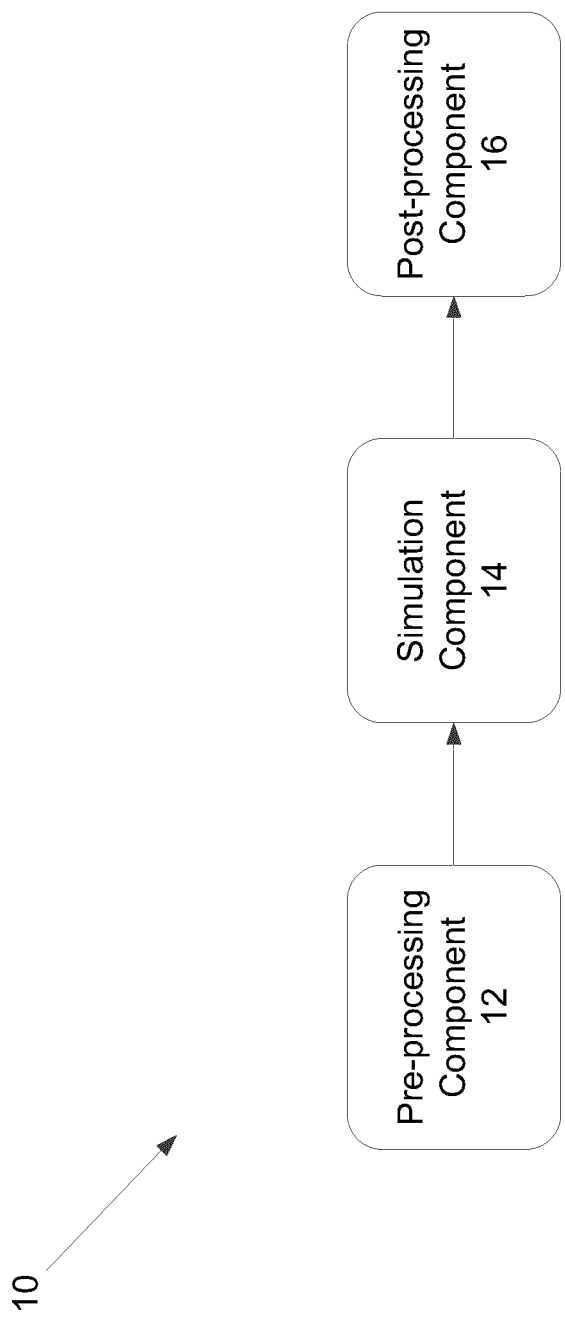
FIG. 2 is a schematic diagram of a system for generating an integrated hydrologic model.

Turning to FIG. 2, a schematic diagram of a system for surface water and groundwater modelling is shown. In a preferred embodiment, the system 10 uses a dynamic mesh evolution. The dynamic mesh evolution allows the nodal locations (positions of computation nodes) in a finite element mesh to change position to more accurately reflect the changing environment through time (e.g., the excavation of a pit). In the current embodiment, the system 10 includes a pre-processing component (or a pre-processing module) 12, a simulation component such as a simulation engine or processing system, 14 and a post-processing component (or a post-processing module) 16.

In operation, the system 10 receives input data from an external source, such as another processor or server, or information that is manually input by a user. For instance, the input data may be received from a weather prediction source, a server storing historical and current weather information, a server storing current landscape details and the like. Other sources of input data are contemplated. The input data may include, but is not limited to, numerical mesh details (e.g., node numbering and coordinates, elemental connections); material properties for each domain; transient boundary condition information and output and tracking requirements.

The pre-processing component 12 functions to condition the input data before it is transmitted to the simulation component 14. The simulation component 14 may include a memory component which stores modules for performing simulations on the conditioned input data.

The post-processing component 16 receives an output (or simulation results) from the simulation component 14 and conditions the simulation results into predetermined data formats. The predetermined data formats include, but are not limited to, formats that are compatible with visualization and analysis software tools for display to the user. In a preferred embodiment, the post-processing component 16 conditions or converts the simulation results into predetermined data formats that are compatible with 3$^{rd}$ party visualization tools such as, but not limited to, Tecplot™ or Paraview™.

Figure 3:
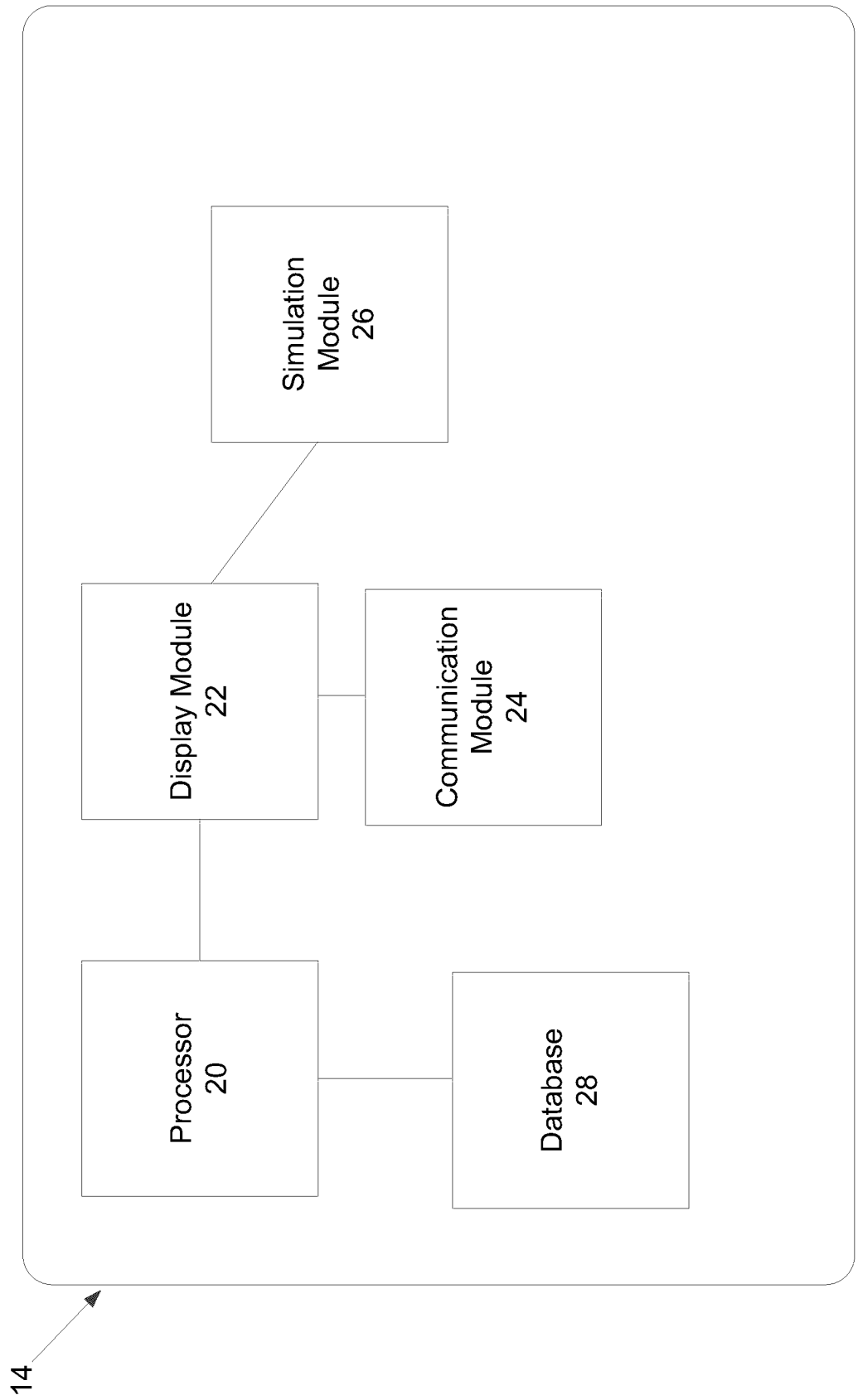
FIG. 3 is a schematic diagram of a system for use in a system for surface water and groundwater modelling using dynamic mesh evolution.

Turning to FIG. 3, a schematic diagram of one embodiment of the simulation component is shown. In the current embodiment, the simulation component 14 includes a processor 20 along with a display module 22, a communication module 24 and a simulation module 26. The simulation component 14 may also include a database or memory 28, for storing data or any models that are generated by the simulation component 14.

In one embodiment, the display module 22 may generate the models or images that are displayed to a user based on the simulations or calculations that are performed by the simulation module 26. Alternatively, the models or images (or the calculations for generating these models or images) may be transmitted to the post-processing component 16 for further conditioning. The communication module 24 may include software, hardware or firmware components for the system to communicate with other devices via wired or wireless communication protocols or to communicate with the pre- and post-processing components. For instance, the communication module 26 may enable the system to communicate with servers to receive the input data or may communicate with user devices to display the models generated by the system 10. In some embodiments, which the system may be seen as stand-alone system, there may not be any communication module as the data may be manually inputted into the system and the model displayed by the system itself.

The simulation module 26 generates or processes the input data to determine how to represent water flow and solute transport in multiple domains. These domains may be seen as subsurface, or groundwater, domains (the landforms that reside below the ground surface) and surface domains (the landforms that reside on the ground surface). Additionally, the simulation component 14 may have at least two simulation modes (steady state and transient) and therefore, can represent a number of processes important to the hydrologic cycle. A schematic diagram of a simulation module 26 is provided in FIG. 5.

Figure 5:
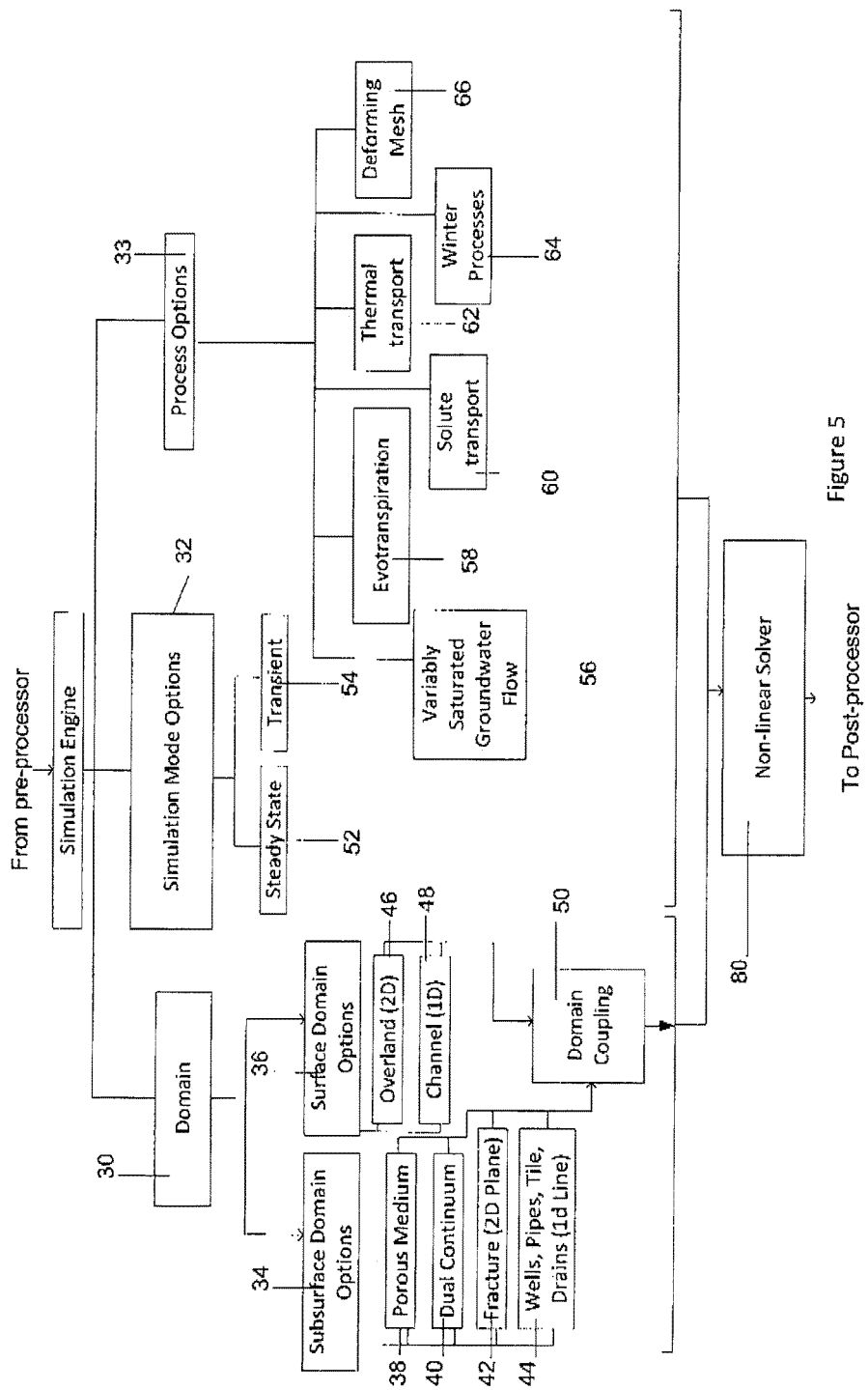
FIG. 5 is a schematic diagram of a simulation engine for use in a system for surface water and groundwater modelling using a dynamic mesh evolution.

As schematically shown in FIG. 5, the simulation module 26 includes a domain portion or component 30, a simulation mode options portion or component 32 and a process options portion or component 33. Each of the individual components 30, 32 and 33 handle different aspects of the model being generated or handles the processing of the input data to determine the measurements or values on which the model can be generated.

In the domain portion 30, the water flow in the different domains, namely the subsurface domain and the surface domain, is modelled. In other words, the domain portion 30 processes the input data to determine how the model should reflect the landscape or landforms with respect to the two domains in response to the natural or human actions. The domain portion 30 includes different subsurface domain options 34 and surface domain options 36. Examples of subsurface domains options 34 include 3D domains such as, but not limited to, a porous medium 38 and a dual continuum domain 40, a two-dimensional (2D) domain 42, and at least one one-dimensional (1D) domain 44. These domains interact through dual node or common node approaches.

With respect to the porous medium domain 38, the porous medium domain is always present during the generation of a model. The porous medium domain 38 can interact with the other domain options, such as the dual continuum domain 40 to represent fractures and macropores, the 2D domain 42 to represent discrete features such as fractures, and/or the 1D domain 44 to represent discrete features such as wells, pipes, and tile drains within the subsurface domain.

In one embodiment, to generate a subsurface model, certain parameters are required for the simulation of water flow in the porous medium domain 38. These parameters may include hydraulic conductivity tensor, specific storage and/or soil water retention characteristics (e.g., Van Genuchten or Brooks-Corey relationship parameters).

With respect to the dual continuum domain 40, the domain 40 may be seen as a second porous medium domain and is used to represent preferential flow through macropores and fractures. Similar to the porous medium domain 38, certain parameters are required for the simulation of water flow in the dual continuum domain 40 for the model being generated. These parameters may include hydraulic conductivity tensor, specific storage and/or soil water retention characteristics (e.g., van Genuchten or Brooks-Corey relationship parameters).

With respect to the 2D domain 42, used to represent discrete fractures in the generated model, fractures are typically represented as 2D parallel surfaces, with the assumption that the total head is uniform across the fracture width. The 2D, or discrete fractures, domain 42 interacts with the porous medium domain 38 and/or the dual continuum domain 40. To generate or represent the simulation of water flow in the discrete fracture domain 42, parameters (or input data that is required) include, but is not limited to, fracture aperture, specific storage, unsaturated flow relationship, and coupling information for interaction with other subsurface domains. A simplified fracture representation called 'high-K plane' is contemplated and uses an effective hydraulic conductivity representation for the fracture instead of specifying fracture aperture. The 'high-k plane' representation is commonly used for fault zones.

With respect to the 1D domain 44, used to represent wells, pipes and/or tile drains in the subsurface domain, these are represented as 1D linear features in the generated model that transmit water and interact with the surrounding porous medium domain 38 through either a dual or common node approach. In order to generate or represent the water flow in the 1D domain for the generated model, the following parameters are required to parameterize the 1D domains: screen radius, flow option (Hagen Poiseuille or Hazen Williams or Manning), and coupling information for interaction to other subsurface domains.

With respect to the surface domain options 36, the current system includes two domain options that represent water flow in the surface domain, seen as a 2D overland domain 46 and a 1D channel domain 48. These surface domains 46 and 48 interact with the subsurface domains 38, 40, 42 and 44 to generate the overall model.

With respect to the 2D overland domain 46, the 2D area surface water flow is represented or generated for the model by a two-dimensional depth-averaged flow equation such as the diffusion-wave approximation of the Saint Venant equation for surface water flow. In order to process the input data for the overland domain 46, the following parameters may be used or required as input: Manning's Friction (x,y), rill storage height and/or obstruction storage Height.

With respect to 1D channel domain 48, open channel water flow along rivers and streams in the surface may be represented or described with Manning's empirical formula. To process the input data to determine the nodes for the model with respect to the 1D channel domain 48, parameters such as channel geometry, Manning's Friction Coefficient, river bank height, streambed thickness, and streambed conductivity may be used or required as input.

In working with these subsurface and surface domains, a domain coupling module 50 may be used to enable these different domains to be combined in a single model. Coupling between the different model domains can be accomplished in at least two different ways or modes.

A first mode, which may be seen as a common node approach, is based on superposition, where a continuity of a hydraulic head is assumed between the two domains being coupled, which corresponds to instantaneous equilibrium between the two domains. A second mode, which may be seen as a dual node approach, does not assume continuity of hydraulic head between the two domains being coupled and uses a Darcy flux relation to transfer water from one domain to the other. The Darcy flux is computed from the hydraulic head difference between two domains and assumes that they are separated by a (possibly) thin layer of porous material across which water exchange occurs.

As outlined above, the simulation module 26 may operate in one of two modes (within the simulation mode options portion 32), namely a steady state mode 52 or a transient flow state mode 54. In practice, only idealized problems are amenable to a direct steady state solution or mode and most simulations are generated, processed or solved in the transient flow state mode.

Within the process options section 33, different process options are contemplated that may further influence the model being generated. These may include a variably saturated groundwater flow option 56, an evapotranspiration option 58, a solute transport option 60, a thermal transport option 62, a winter processes option 64 and a deforming mesh portion 66.

For the variably saturated groundwater flow option 56, 3D variably saturated transient water flow in the porous medium 38 and dual continuum domains 40 is solved according to a modified form of Richards' equation. Simulation of water flow in these domains is generally subject to the following assumptions: the fluid is essentially incompressible, the porous medium (and other interacting domains if present) are not deformable, the system is under isothermal conditions, and the air phase is infinitely mobile. Another process option is the evapotranspiration option 58. Interception and comprehensive evapotranspiration is a mechanistic process governed by plant and climatic conditions. Interception is the process involving the retention of a certain amount of precipitation on the leaves, branches, and stems of vegetation or on buildings and structures in urban areas of the model being generated. In one embodiment, the interception process is simulated by the bucket model, wherein precipitation in excess of interception storage and evaporation from interception reaches the ground surface. Evapotranspiration is rigorously modeled as a combination of plant transpiration and evaporation and affects both the surface and subsurface water flow domains. Transpiration from vegetation occurs within the root zone of the subsurface which may be above or below the water table. In a preferred embodiment, the rate of transpiration is calculated using the Kristensen and Jensen formulation.

Another option for processing of the input data is the solute transport option 60. Solute transport is solved for all the surface and subsurface domains. The free exchange of solute between domains is handled using through domain coupling, similar to the process performed for the movement of water between domains (as described above). The transport of solutes may be subject to dispersion, retardation, degradation, chain-decay, and density effects.

Another processing option of the input data is the thermal transport 62. The representation of thermal transport is hydrodynamically based, and not thermodynamically based. As such, the application of this method is not appropriate for high temperature, high pressure, hydrothermal conditions, but is appropriate for most shallow surface water/groundwater systems. Density effects are accounted for in thermal transport.

For processing the input data with respect to winter conditions, the winter processes option 64 is used. Winter processes may include snow accumulation and/or snow melt as this adds to the water flow. The melting of snow in the surface domain is treated as an additional source of water input to the system. The volume and rate of water added to the surface domain is either computed externally and applied to the simulation, or can be calculated internally using a Degree Day formulation. Another example of a winter process is soil freeze and/or thaw. In the porous media domain 38, a temperature dependent ice saturation is computed to which restricts the ability of water to move through the subsurface. A simple one-dimensional analytical model may be employed to determine the vertical distribution of the temperature.

The deforming mesh option 66 is typically used with the surface water and porous media domains, under transient solution conditions and the different process options. The deforming mesh allows computation nodes to be moved in order to reflect changing elevation in the generated model. Rather than a finite mesh, as currently used, the dynamic, or deforming, mesh provides a more realistic model.

After the input data has been processed by the different domains and options, such as dictated by the processor, all of the data is then collected into a non-linear solver 80 that provides or generates the hydrologic simulation (or model). The integrated hydrologic simulation relies on a control volume finite element method to solve the flow equations for all domains considered in the simulation and may use either the standard Galerkin finite element method or the control volume finite element method to solve the transport equation. Elements available to solve the 3-D porous medium and dual continuum equations are rectangular prisms (8-node elements), 3-D triangular prisms (6-node elements), and 3-D tetrahedra (4-node elements). The 2-D fracture and surface equations are solved for using either rectangular (4-node elements) or triangular elements (3-node elements) and the 1-D well, tile drain and channel equations are solved for 1-D linear elements (2-node elements). For the 3-D and 2-D elements, a finite difference approximation is also available.

The model solutions are computed for either linear equations (for fully-saturated flow or solute transport) or non-linear equations (for variably-saturated subsurface flow, surface flow, solute transport with a flux-limiter, including density-dependent flow and transport). The nonlinear equations are preferably solved via the robust Newton-Raphson iterative method, except in the case of the weakly nonlinear density-dependent problem, which is solved by Picard iteration. The linear system that arises from the Newton iteration is solved by a preconditioned Krylov subspace iterative method, typically either GMRES or BiCGSTAB.

Figure 4:
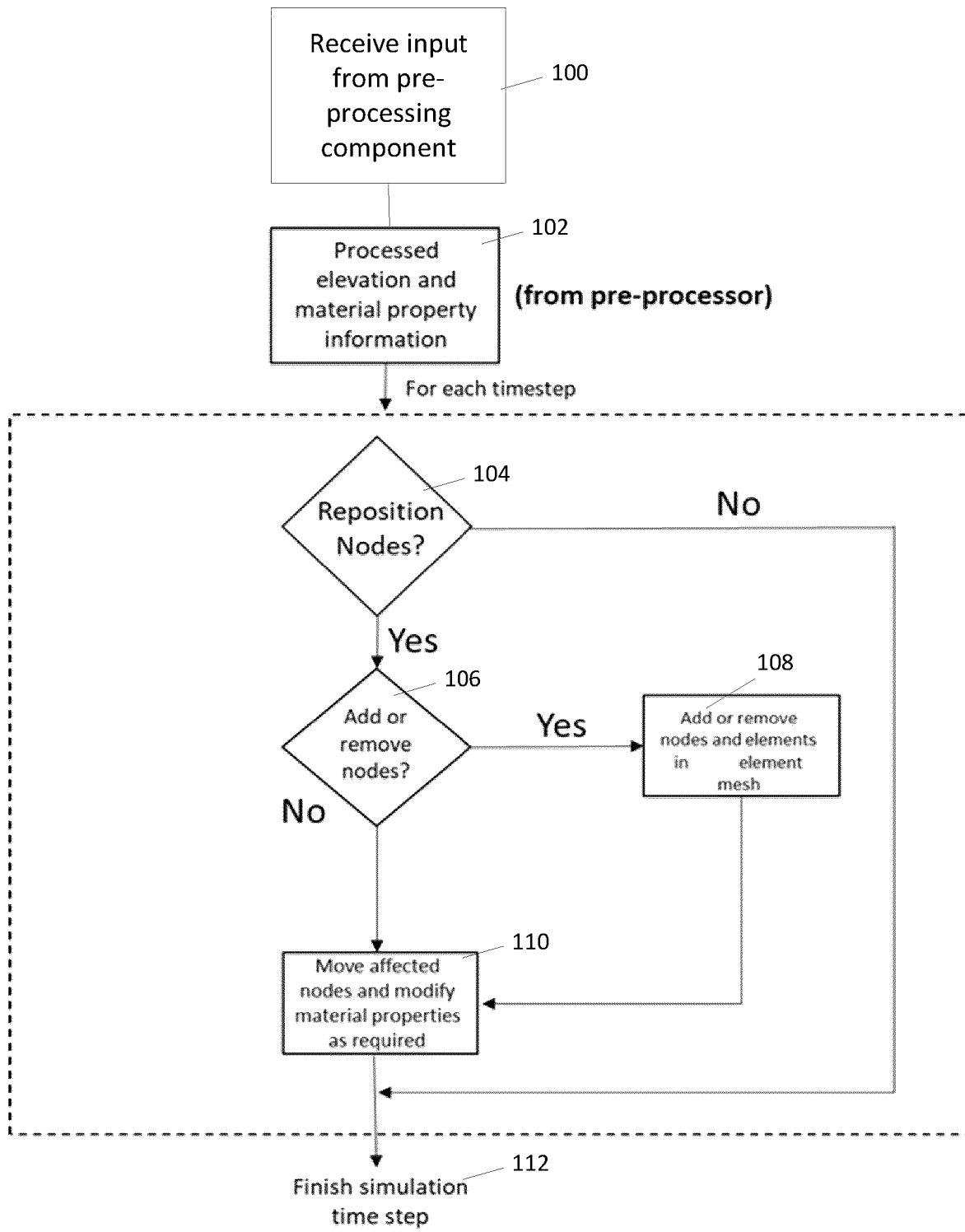
FIG. 4 is a flowchart outlining a method of surface water and groundwater modelling using a dynamic mesh evolution.

Turning to FIG. 4, a flowchart outlining one embodiment of a method for integrated surface water and groundwater modelling is shown. Prior to the initiation of the method for generating the model, outputs from the simulation component, or in other words, the desired output of the simulation engine can then be defined. The definition of the outputs assists in the model generation method. In general, this definition is performed each time a model is being generated.

Initially, information is received from the pre-processing component (100). In some embodiments, the system may also perform the pre-processing of the initial input that is received from external parties.

In another embodiment, the pre-processing component may be part of the system and in some embodiments, the pre-pre-processing component may not form part of the system. In one embodiment, where the pre-processing component is part of the system, the setup of the pre-processing component may include configuring a pre-processing component setup file which includes a 3D finite element mesh definition having time varying elevation details for dynamic mesh, a domain definition that includes configuring porous medium, surface, and fracture domains and a process definition that includes configuring and parameterization relevant processes or options such as, but not limited to, variably saturated groundwater flow, winter processes, 2D surface flow, dynamic mesh evolution and evapotranspiration. In one embodiment, the pre-processing component may read a text file which contains a series of commands that configure the components of the model to be generated. This text file may be written using a scripting language. In general, the pre-processing component conditions all of the input data so it is available to be used by the simulation engine or component.

After receiving the pre-processed information, the system processes elevation and material property information (102). As such, the system may be able to gather or gain an understanding of the topography of the landform being modelled or the initial characteristics of the landform being modelled.

A determination is then made to determine if nodes need to be repositioned (104). In one embodiment, this may be a query on the elevation property information to determine if an elevation change is required for a given timestep. In one embodiment, the nodes represent elevation points with respect to the landscape being modelled and as the simulation model moves through time, the elevation or topography of the landscape being modelled may also change which may result in a node being repositioned. If the elevation or topography of the landscape being modelled does change within a given time frame or timestep, the nodes will need to be repositioned to reflect the elevation change. This may be determined via the calculations or processing of the input data by the simulation engine. For instance, if the system determines that a landform loses 10 feet over a predetermined time range due to a mining operation, the generated model reflects the changing elevation over this time range in the generated model based on the dynamic or deforming mesh where the computation nodes can be added, removed or moved based on the processing. In the current system, the computation nodes are finite so that even if an elevation change is being experience, the nodes remain in the same position over the time range of the simulation such that elevation changes are not displayed by the model.

If nodes are to be repositioned, a determination is made to see if nodes need to be added or removed (106) to reflect a change in elevation. If nodes are to be added or removed, the nodes (along with elements which represents space between the computational nodes and contains the physical properties of the system (e.g. hydraulic conductivity) are added or removed in a deforming element mesh (108). The nodes that are affected are then moved and their material properties modified, as required (110). In other words, any metadata associated with the nodes is updated based on their new position within the model based with respect to their initial position. In another embodiment, the material properties of each element can change with time such that, if required by the input data, the material properties change for a given timestep. The updated metadata may then be used to generate the simulation model. If it is determined that no nodes need to be added or removed (in 106), the simulation goes to the next timestep.

In both cases, whether nodes are to be added, removed or unchanged, after the material properties are modified (110), the simulation time step is deemed complete (112). Also, if no nodes need to be repositioned (104), the simulation time step is deemed complete (112).

As the nodes are repositioned due to the simulation or simulations performed by the system, use of the dynamic mesh allows elevation changes from the original landscape to the simulated landscape to be more clearly represented. In this manner, the model may be seen as a more realistic model with the landscape changing in a dynamic manner rather than being displayed in a static manner.

In a more specific example, which may be used for the modeling of a mined landscape (such as an open pit surface mining application), data is input and processed by the pre-processing component. In this example, the pre-processing may include the development of a 2D triangular prism mesh with a local grid refinement for higher resolution representation of features of interest (e.g., pits and/or tailings piles). The pre-processing of the input data may also include the assembly or collection of subsurface information, including, but not limited to, hydrostratigraphic geometry (elevation surfaces), porous media material properties (time varying if required for representing landscape evolution) and/or fracture details (orientation, extent, hydraulic properties). The pre-processing may also include an assembly of surface domain information, including, but not limited to, topography (time varying if required), land classification mapping, vegetation mapping, and associated parameterizations. Also, boundary condition information such as climatology (historic and forecasted) and mine operations (e.g., dewatering) may be considered/processed.

After receiving the pre-processed information, the simulation engine then plots the information into a model using a dynamic mesh evolution. In typical systems, a nodal position is fixed within the generated model whereby changes in elevation of the landscape due to human or natural actions are not able to be clearly identified, displayed, or simulated numerically. In the current disclosure, the deforming, or dynamic, mesh is used to update the z-position (or the elevation of changing landscape or landform) in the generated model. Firstly the simulation component executes the method of generating a model (such as outlined in FIG. 4) and then numerical solver parameters are adjusted to improve or optimize run time and mass balance accuracy.

After performing the simulation, the output from the simulation engine is then transmitted to the post-processing component which processes the simulation engine output such that the simulation results may be displayed to a user for visualization and analysis. In one embodiment, the post-processing component may convert model results that are stored in an efficient binary format but cannot be easily read by visualization software into a format that can be visualized by $3^{rd}$ party visualization tools.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether elements of the embodiments described herein are implemented as a software routine, hardware circuit, firmware, or a combination thereof.

Embodiments of the disclosure or components thereof can be provided as or represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor or controller to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor, controller or other suitable processing device, and can interface with circuitry to perform the described tasks.

What is claimed is:

1. A method of integrated surface water and groundwater modelling for a predetermined landscape comprising:
    processing elevation and material property information associated with the predetermined landscape to determine location of a set of computational nodes within a digital dynamic element mesh;
    determining, based on received input data, if any of the set of computational nodes need to be repositioned whereby if at least one computational node needs to be to repositioned, adding or removing nodes in the dynamic element mesh;
    updating metadata associated with each of the set of computational nodes to reflect elevation changes within the landscape based on a new position of each of the set of computational nodes;
    generating a three-dimensional (3D) model based on the updated metadata; and
    displaying the 3D model based on the evolution of the dynamic element mesh.

2. The method of claim 1 further comprising, before processing the elevation and material property information:
    pre-processing the input data.

3. The method of claim 1 wherein determining if nodes within a model of the predetermined landscape need to be repositioned comprises:
    processing the input data with respect to subsurface and surface domain options;
    processing the input data with respect to process options; and
    determining if an elevation change has occurred due to the subsurface and surface domain options and the process options.

4. The method of claim 3 wherein processing the input data with respect to subsurface domain options comprises:
    processing the input data with respect to a porous medium domain; and
    processing the input data with respect to at least one of a dual continuum domain, a two-dimensional (2D) domain and a one-dimensional (1D) domain.

5. The method of claim 3 wherein processing the input data with respect to the surface domain options comprises:
    processing the input data with respect to at least one of a two-dimensional (2D) overland domain and a one-dimensional (1D) channel domain.

6. The method of claim 1 wherein displaying the model comprises:
    converting the updated metadata to predetermined data formats.

7. The method of claim 6 wherein the predetermined data formats are compatible with $3^{rd}$ party visualization tools.

8. The method of claim 2 wherein the input data is processed in a steady state or a transient state.

9. A system for integrated surface water and groundwater modelling for a predetermined landscape comprising:
    a processor including:
        a simulation module having stored within instructions that, when executed cause the processor to process elevation and material property information associated with the predetermined landscape to determine location of a set of computational nodes within a dynamic element mesh; determine, based on received input data, if any of the set of computational nodes need to be repositioned whereby if at least one computational node needs to be to repositioned, adding or removing nodes in the dynamic element mesh;
    and update metadata associated with each of the set of computational nodes to reflect elevation changes within the landscape based on a new position of each of the set of computational nodes; and
    a post-processing component for receiving the updated metadata and for generating a three-dimensional (3D) model based on the updated metadata; and displaying the 3D model based on the evolution of the dynamic element mesh.

10. The system of claim 9 wherein the system further comprises:
    a pre-processing component for processing the input data and for transmitting the processed input data to the simulation module.

11. The system of claim 10 wherein the pre-processing component is integrated within the processor.

12. The system of claim 9 wherein the post-processing component is integrated within the processor.

13. The system of claim 9 further comprising a communication module to enable the system to communication with other servers or devices.

14. The system of claim 9 further comprising a database for storing the updated metadata.

* * * * *